Feb. 14, 1956
J. L. CORL ET AL
2,735,066
COUNTING-RATE METER
Filed March 7, 1951
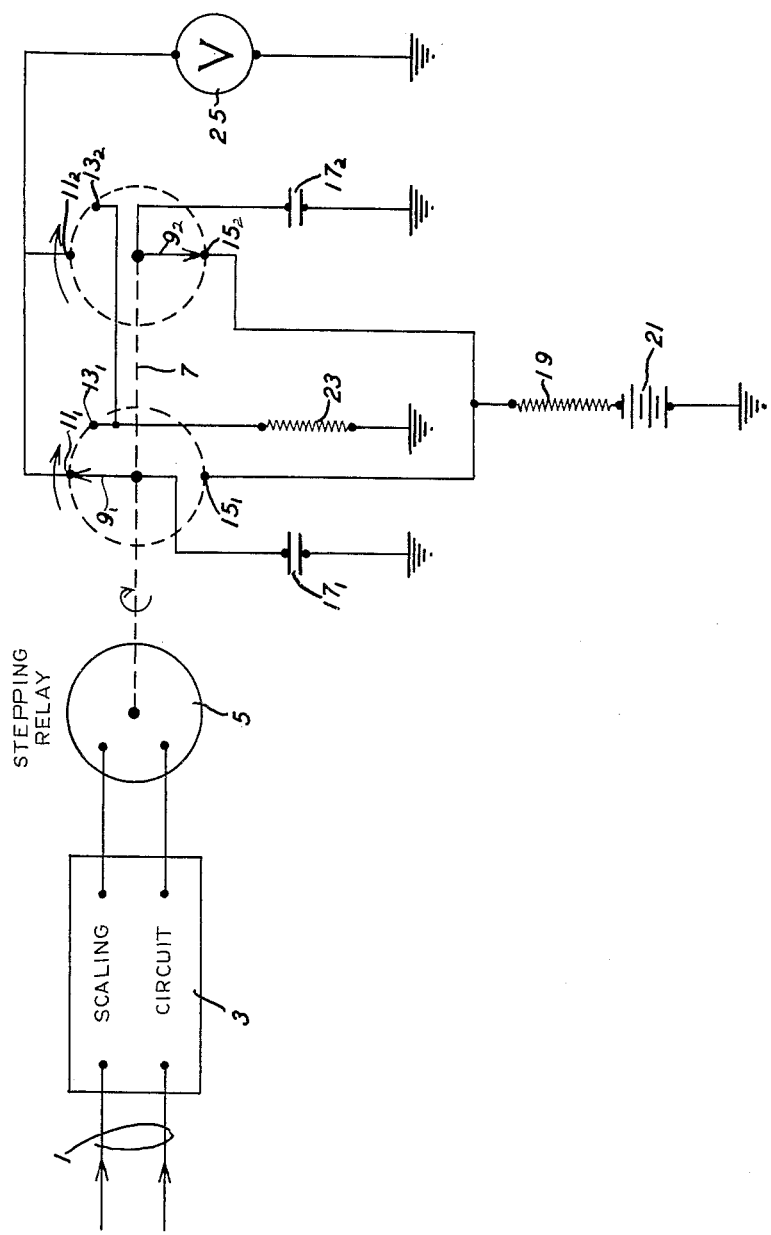
INVENTORS
John L. Corl
BY Richard Gundelfinger
Lippincott + Smith
ATTORNEYS United States Patent Office 2,735,066
Patented Feb. 14, 1956

2,735,066

COUNTING-RATE METER

John L. Cori, Richmond, and Richard Gundelfinger, San Pablo, Calif., assignors to Berkeley Scientific Corporation, Richmond, Calif., a corporation of California Application March 7, 1951, Serial No. 214,366

6 Claims. (Cl. 324—68)

This invention relates to devices for measuring the rate of occurrence of electrical pulses representative of events, or, what amounts to the same thing, of measuring the intervals between such pulses. An example of the use of such a device is in determining the rate at which pulses are generated by a Geiger-Müller counter in the determination of the activity of radioactive materials. As is well known the impulses provided by such a counter occur at random intervals, although statistically, if measured over a long enough period of time, their average rate is constant. Other applications of such a device are in determining the rate of operation of switching mechanisms; the latter may be either uniform or the operations may be random in nature, as, for example, in the determination of the rate at which calls come into a telephone exchange. The device is useful in any case in which it is desired to know the rate at which any event, which may be represented by or converted into an electrical pulse, occurs.

Counting-rate meters, as employed in the past have ordinarily comprised, first, some form of pulse-shaping circuit which converts all of the pulses received into pulses of uniform amplitude and duration, second, an integrating circuit comprising a condenser and resistor in parallel, and, finally, a metering circuit which is essentially a voltmeter for measuring the charge built up in the condenser by the shaped pulses. In these devices each pulse adds a fixed charge to the condenser; the charges leak off through the registor at a rate proportional to the voltage which has been built up across it by the incoming pulses and this, in turn, depends upon the rate at which they have been supplied. The voltage registered by the metering circuit is therefore a function of the counting rate. It has been shown that the meter reading $E_m$ at a time $t$ when a variable input pulse current, $i_c$ has been metered for a long time, $t$, is $$E_m(t) = 1/RC \int_0^\infty i_c(t-s)e^{-s/RC}ds$$

In this equation R is the resistance bridge across the capacity, C, of the condenser and the product $RC = T$ is the time-constant of the integrating circuit. From this equation it can be seen that the circuit weights the pulses which occurred $s$ seconds prior to the time $t$ by a factor $e^{-s/RC}$; this is the "memory" of the device. A reading given by it at any instant is always affected by this memory. Events occurring at a given instant have a diminishing effect upon the reading of the device as time goes on but this effect does not become negligible until a period equal to several time-constants has elapsed since the event occurred. It is therefore impossible for the device to register immediately a sudden change in counting-rate and it may be highly important to known when such a change occurs.

Among the objects of this invention are to provide a counting-rate meter which has no memory but which gives a direct reading of the average rate at which a fixed number of counts have occurred, unaffected by what the previous counting-rate has been; to provide a counting-rate meter which does not require the use of a preliminary pulse-shaping circuit; to provide a counting-rate meter which, in the case of randomly occurring pulses occurring at rates too rapid for direct observation (e. g., several thousand per second as may be the case with Geiger counter pulses) will give an indication of the true average counting-rate or interval over a fixed number of pulses instead of a weighted average over a more or less indeterminate period or number of pulses, and, in general, provide a meter which is simple, accurate, readily maintained, and which may be built of standard and well-known components.

In accordance with the present invention at least two condensers are provided which are connected to a switching arrangement whereby one is connected through a charging resistor of known and constant value to a source of constant potential, while the other is connected to a high-impedance metering circuit for measuring the condenser potential, and the connections of the condensers are transposed on the arrival of each pulse. The switching is accomplished by a device which is in function, although not necessarily in construction, a stepping relay, actuated by the pulses to be measured, either directly or through a scaling circuit. The time-constants of the two condensers, when connected through the charging resistor, are made equal and of the order of magnitude of the longest normal interval between the pulses actuating the stepping relay or its equivalent. The switch is so arranged that in the transition of its connections between the metering circuit and the charging circuit each condenser is discharged, so that when connected to the charging circuit the charge starts from substantially zero.

If the condensers have equal capacities C and are charged through a common resistor R the voltage across either, at an interval $t$ after the charging starts, will be $V = E(1-e^{-t/RC})$ where E is the constant voltage of the source from which they are charged and $e$ is the Napierian base. The interval $t$ is, of course, the interval between the pulses actuating the stepping relay. The metering circuit thus measures the voltage which has accumulated on one or the other of the condensers during this interval. Conveniently the metering circuit may be a vacuum tube voltmeter of known type, an electrostatic voltmeter, or other device having very high input impedance, so that the time-constant of the circuit including the condenser and the metering circuit is extremely long in comparison with the intervals to be measured. With either type of device suggested, the resistive factor in the time-constant can be made very high indeed, being, in fact, the leakage resistance of the condenser and the insulation of the circuits employed. The condenser, so connected, will hold its charge for several hours whereas the intervals to be measured will usually be of the order of seconds or minutes at most. The meter can therefore be calibrated directly either in terms of the counting-rate or its reciprocal, the interval between pulses.

The single figure of the drawing in a diagram, partly in block form, showing the essential elements of the device of this invention.

Considering this figure, the pulses to be counted are fed through an input circuit 1 to a scaling circuit 3. The latter may be of any conventional type, but is usually a cascade of bi-stable multivibrator circuits of the Eccles-Jordan type. The scale used will depend upon the specific duty for which the counter itself is to be used and the scale employed determines the number of counts to be integrated in each measurement of the counting-rate. So far as the present invention is concerned it is unimportant whether a binary, a decimal, or some other type of scale is used; whatever the scale may be, the scaling circuit delivers a single output pulse for each N input pulses. It may be noted here that the "expected standard deviation" between successive readings of the meter is equal to $$\frac{1}{\sqrt{N}}$$

Observationally, this factor is a measure of the flutter of the meter index which is to be expected when the pulses counted are random in nature.

The output pulses from the scaling circuit are fed into what is essentially a stepping relay 5, although mechanically it may take a variety of forms. A large number of stepping relays are available on the market. In their most usual form such relays comprise a ratchet motor wherein a magnet or solenoid pulls down a pawl at each actuation, the pawl engaging the ratchet and rotating a shaft through a fixed angle. In the simplest form one or more switches of the "wafer" type may be mounted upon the shaft and by the choice of such switches almost any switching sequence may be provided, so long as the number of fixed contacts on the wafer switches is integrally related to the number of teeth on the ratchet. With such an arrangement it is not necessary that the shaft accomplish a complete revolution for each switching cycle since contacts can be connected in multiple so that the cycle is repeated any desired number of times for each revolution of the shaft.

In the drawing the shaft is indicated diagrammatically by the dotted line 7. Two switch arms or movable contacts $9_1$ and $9_2$ are mounted on and rotate with the shaft. In order to simplify the drawing only three contacts are shown on each switch, i. e., contact $11_1$ and $11_2$, $13_1$ and $13_2$ and $15_1$ and $15_2$. With this arrangement the switch arms 9 and 9′ would have to rotate 180° at each operation of the relay, the switch arms occupying either the position shown or reversing in position the end of each operation of the relay, passing, in the transition between contacts $11_1$ or $11_2$ to the opposite position over the intermediate contacts $13_1$ and $13_2$. In actual practice the contacts shown would be multiplied. In one such device which has been built commercially, a stepping relay marketed under the name of "Ledex" has been used, which rotates its shaft 60° for each pulse fed into it and therefore makes one complete revolution for each six operations. Wafer switches having twelve fixed contact points are used with this relay so that the switch arm passes over an intermediate contact at each step. Each of the three contacts shown in the diagram is therefore represented by three multiples, every fourth contact being left unconnected. Many other arrangements are possible depending upon the particular stepping relay chosen.

Considering now the metering circuit itself, the movable contacts or switch arms $9_1$ and $9_2$ are connected, respectively, to two condensers, $17_1$ and $17_2$ of substantially identical capacity, the other sides of which are grounded. Contacts $15_1$ and $15_2$ are connected, in parallel, through a charging resistor 19 to a substantially constant potential source 21, which is indicated, for illustrative purposes, as a battery, and thence to ground. Fixed contacts $13_1$ and $13_2$ are also connected in parallel to ground through a small resistor 23. The value of this resistor is only a few ohms; its primary purpose is to make non-oscillatory the circuit which is established when the switch arm connects it to either of the condensers. Contacts $11_1$ and $11_2$ both connect to the metering circuit proper, the latter being symbolically indicated by a voltmeter 25, the other side of which connects to ground.

The most convenient type of metering circuit utilizes one of the various kinds of vacuum tube voltmeters having a high input impedance. Several such are commercially available. Characteristically, they use cathode-follower tubes in their input circuits, and when so constructed their input impedance may be made to be of the order of several thousand megohms. It is not necessary to this invention, however, that this type of metering circuit be used; electrostatic voltmeters or electroscope meters, whose input conductance is only that due to insulation leakage can also be employed. In view of this fact and of the commercial availability of high input impedance meters of various types it is not considered necessary to describe the meter in further detail.

The operation of the device should now be apparent. If it be assumed that the stepping relay has just operated, condenser $17_2$ is connected from ground through charging resistor 19 to the fixed potential source 21 and thence back to ground. This condenser therefore immediately starts to charge, the voltage across it increasing with time in accordance with the equation above given. The rate at which the condenser accumulates this charge depends upon the time-constant of the circuit comprising the condenser and the charging resistor. In the particular commercial form of the device which has been referred to above the condensers $17_1$ and $17_2$ have capacities of 10 microfarads each. With this device there is offered an option of charging resistors of 0.4 megohm, 4 megohms, and 40 megohms, giving, with the 10 microfarad condensers, time-constants of from 4 to 400 seconds. In practice the time-constant is selected which is of the order of magnitude of the longest interval normally to be expected between the counts fed to the relay by the scaling circuit.

After some interval $t$ a new pulse will be fed to the stepping relay and the moving contact $9_2$ will be transferred to contact $11_2$, moving contact $9_1$ coincidentally transferring to contact $15_1$ and passing, in its transition, over contact $13_1$. Condenser $17_2$ is now connected to the metering circuit and the voltmeter will indicate the potential which the condenser has acquired during its charging period. In the meantime condenser $17_1$ is accumulating a charge until such time as the next pulse arrives from the scaling circuit and the connections, considered as between the two condensers, are reversed.

When the contact $9_2$ passes over fixed contact $13_2$ condenser $17_2$ discharges through resistor 23. The latter has a value of only a few ohms. In contrast to the charging circuit, having a resistance of the order of megohms, the time-constant of the discharging circuit is very small, so that even in the brief time occupied by the passage of the moving contact over the fixed contact $13_2$ the charge on the condenser $17_2$ becomes too small to be measured by the voltmeter circuit.

On the other hand, owing to the high input impedance of the voltmeter, the time-constant of the metering circuit is very large. Tests of the actual instrument already referred to have shown that the condensers used retain over 90% of their charge after a period of four hours when connected to the metering circuit. Since the time-constant of the charging circuit employing the 40 megohm charging resistor is twenty-five minutes, and this is the longest interval that this instrument is intended to measure, the error due to leakage and loss of charge becomes very small, actually something of the order of 1% of the lowest counting rate and progressively less as the counting-rates become higher.

The scale of the meter can be calibrated directly, either in terms of the counting-rate or of its reciprocal, the interval between pulses. As the equation above given shows, the voltage is proportional to the logarithm of the interval and it is therefore easy to translate a voltage scale into a counting-rate scale or an interval scale.

Where the device is used to determine the rate of randomly occurring impulses the scaling circuit is a necessary element if the reading is to have any real meaning as a rate; otherwise the reading is only an indication of the interval between the last two pulses. Where the pulses come in a substantially uniform sequence the scaling circuit is not necessary. The instrument can be used as a tachometer, for example, or a pulse-rate indicator (in the physiological sense) without this adjunct.

The range of indication given by any one charging resistor is very wide. For example, the commercial instrument mentioned will read counting-rates of from 4 per minute to 400 per mniute with substantially equal percentage accuracy when a 0.4 megohm charging resistor is used, of from .4 per minute to 40 per minute with a 4 megohm charging resistor.

Numerous simple modifications of the device as shown are obviously possible. The number of condensers need not be limited to two; three might equally well be used, whereof one could be connected to the discharging circuit, the second to the charging circuit and the third to the metering circuit, each advancing one step in this sequence for every operation of the relay. The relay need not be a stepping relay in the ordinary sense, since multiple contact relays of the telephone type can be connected to operate in sequence and accomplish the same result. We do not, therefore, wish to indicate that we consider the invention to reside in the specific components used but rather in the combination as defined by the following claims.

We claim:

1. A counting rate meter comprising two condensers of substantially equal capacity, a source of substantially constant charging potential for said condensers, indicating means adapted to measure the charge accumulated on said condensers from said source, a charging circuit connected to said source and a discharging circuit for each of said condensers, one of said circuits including a resistor to give a relatively long time constant when connected to one of said condensers and the other of said circuits being of minimum resistance to give a relatively very short time constant when so connected, and switching means actuated by the pulses to be counted and having connections to said condensers and to said circuits and indicating means respectively for interchanging the connections of said condensers between said high resistance circuit and said indicating means and for connecting said low resistance circuit to each of said condensers successively following its connection to said indicating means.

2. A meter in accordance with claim 1 for measuring the rate of occurrence of randomly occurring electrical pulses including scaling means for delivering a single output pulse upon receiving a predetermined number of input pulses whose counting-rate is to be determined and having an output circuit connected to actuate said switching means.

3. A counting-rate meter in accordance with claim 1 wherein said switching means comprises a stepping relay.

4. A meter for counting the rate of occurrence of electrical pulses representative of events to be counted comprising at least two condensers of substantially equal capacities, a plurality of circuits, each to be connected in turn to each of said condensers, one of said circuits including a voltmeter and having resistance such that its time-constant when connected to one of said condensers is long in comparison to the mean interval between the pulses to be counted, another of said circuits being a charging circuit and including a source of substantially constant potential and resistance such that its time constant with one of said condensers is of the order of magnitude of the longest normal interval between the pulses to be counted, and a third circuit being a discharge circuit the time constant whereof with one of said condensers is short in comparison with the shortest normal interval between pulses to be counted, and means adapted for actuation by the pulses to be counted for switching each of said condensers in succession to said charging, voltmeter and discharging circuits, one of said condensers being connected to said charging circuit when another is connected to said voltmeter circuit.

5. A meter for counting the rate of occurrence of electrical pulses representative of events to be counted comprising a pair of condensers having substantially equal capacities of C farads, a circuit including a voltmeter having a resistance of R ohms such that the product RC is large in comparison to the average interval $t$ seconds between the pulses to be counted, a charging circuit comprising a source of substantially constant electrical potential and a resistor in series therewith, and a stepping relay provided with contacts connected respectively to said condensers, said charging circuit and said voltmeter circuit and arranged to connect each of said condensers alternatively across said charging circuit and to interchange the connections of said condensers between said circuits at each actuation of said stepping relay, and means for discharging each of said condensers during the interchange of its connections between said voltmeter circuit and said charging circuit.

6. A counting-rate meter for electrical pulses comprising at least two condensers, means for charging said condensers at a known rate, means for measuring the charges accumulated by said condensers, and switching means actuated by the pulses to be counted for alternately connecting each of said condensers to said charging means and said measuring means and for discharging said condensers following their connection to said measuring means.

References Cited in the file of this patent

UNITED STATES PATENTS

| Number | Name | Date |
|---|---|---|
| 2,021,766 | Bivens | Nov. 19, 1935 |
| 2,336,929 | Doyle | Dec. 14, 1943 |
| 2,423,194 | Long | July 1, 1947 |
| 2,490,674 | Christ et al. | Dec. 6, 1949 |
| 2,511,868 | Newson | June 20, 1950 |
| 2,523,297 | Hastings | Sept. 26, 1950 |
| 2,523,399 | Stoner et al. | Sept. 26, 1950 |
| 2,540,505 | Bliss | Feb. 6, 1951 |
| 2,555,865 | Warren | June 5, 1951 |
| 2,592,342 | Ryckman | Apr. 8, 1952 |
| 2,673,956 | Beard | Mar. 30, 1954 |

FOREIGN PATENTS

| 130,403 | Australia | Dec. 1, 1948 |